(No Model.)
M. PATTERSON.
BICYCLE BALL BEARING.
No. 576,147. Patented Feb. 2, 1897.
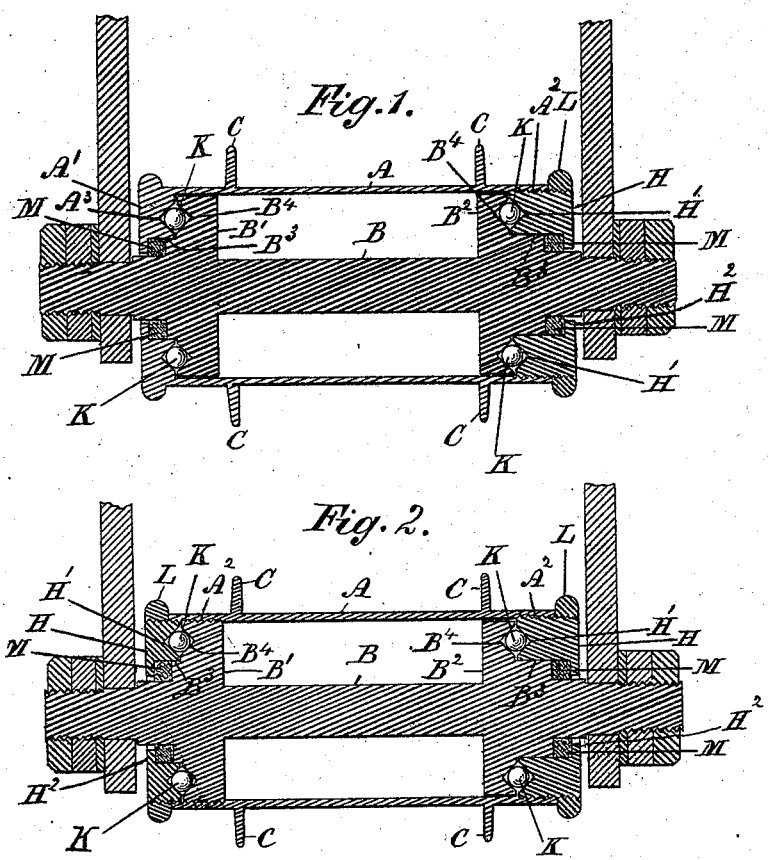
Witnesses:
John Grist
H. H. Horley
Inventor:
M. Patterson
By Henry Grist
Attorney.

UNITED STATES PATENT OFFICE.

MANASSEH PATTERSON, OF ALMONTE, CANADA.

BICYCLE BALL-BEARING.

SPECIFICATION forming part of Letters Patent No. 576,147, dated February 2, 1897.

Application filed August 10, 1896. Serial No. 602,233. (No model.)

*To all whom it may concern:*

Be it known that I, MANASSEH PATTERSON, of Almonte, in the county of Lanark, in the Province of Ontario, in the Dominion of Canada, have invented certain new and useful Improvements in Bicycle Ball-Bearing Journals; and I do hereby declare that the following is a full, clear, and exact description of the same, reference being had to the accompanying drawings, in which—

Figure 1 is a central longitudinal section showing my ball-bearing as applied to the hub of a bicycle. Fig. 2 is a modification of the same.

My invention has for its object to provide a hub with ball-bearings consisting of but few parts, which shall be almost frictionless, exclude dust, and retain lubricating-oil.

My invention consists in the construction, arrangement, and combination of the hub, the journal, and the bearings for the balls.

Referring to Fig. 1, A is a metallic shell or hub having a partially-closed end A', through which the journal or shaft B passes, and the other open end internally provided with a screw-thread $A^2$. The spokes C are secured to the hub in the usual way. The shaft or journal B has within the hub, near the ends, collars B' $B^2$, each provided with a recessed portion $B^3$, each collar having an annular groove $B^4$, in which balls K run, and said recessed portion in $B^2$ receives a ring H, screwing into the hub at $A^2$ to close the end, and said ring is provided with an annular groove H', coinciding with the groove $B^4$ in the collar, and said grooves receive the balls K on four points or bearings, and the ring is adjusted to allow the balls to run freely. The end A' of the hub is provided internally with an annular V-groove $A^3$, corresponding to the V-groove $B^4$ in collar B' of the journal, and said grooves receive the balls K. The end A' is provided with an annular recess to receive a felt washer or packing M to exclude dust and retain oil of lubrication.

L is a locking-ring screwed on ring H by a right or left hand thread to hold the ring H from turning after being adjusted in the hub to suit the balls. The ring H is recessed close to the journal and provided with a lip $H^2$ to receive and hold a felt washer or packing M.

If required, the hub may be made tubular throughout, and both ends closed by rings H, as shown in Fig. 2.

I claim as my invention—

1. The combination with the tubular hub A, of the shaft or journal B, having collars B', $B^2$, each provided with a recessed portion $B^3$, having an annular bearing or V-groove $B^4$, for the balls; a ring H, screwing within the hub and filling said recess in collar $B^2$ and provided with an annular V-groove H', said grooves $B^4$, and H', forming annular ball-races; balls K, in said races, and a locking-ring L, screwing on said ring H, as set forth.

2. The combination with the hub A, having a V-groove in a closed end, of a journal B, having collars B', $B^2$, each provided with a recessed annular portion $B^3$, having an annular V-groove $B^4$, a ring H, screwing into the open end of said hub and provided with an annular V-groove H', balls K, in said grooves, a locking-ring L, screwing on said ring H, and a washer M, as set forth.

M. PATTERSON.

Witnesses:
 HAROLD JAMIESON,
 ANDREW HAYDON.